United States Patent
Hintikka

(10) Patent No.: US 9,387,473 B2
(45) Date of Patent: Jul. 12, 2016

(54) BRAKE MECHANISM FOR AN ELECTRONIC PIPETTE

(71) Applicant: SARTORIUS BIOHIT LIQUID HANDLING OY, Helsinki (FI)

(72) Inventor: Ville Hintikka, Espoo (FI)

(73) Assignee: SARTORIUS BIOHIT LIQUID HANDLING OY, Helsinki (FI)

( * ) Notice: Subject to any disclaimer, the term of this patent is extended or adjusted under 35 U.S.C. 154(b) by 0 days.

(21) Appl. No.: 14/385,710

(22) PCT Filed: Apr. 2, 2013

(86) PCT No.: PCT/FI2013/050359
§ 371 (c)(1),
(2) Date: Sep. 16, 2014

(87) PCT Pub. No.: WO2013/144457
PCT Pub. Date: Oct. 3, 2013

(65) Prior Publication Data
US 2015/0050197 A1      Feb. 19, 2015

(30) Foreign Application Priority Data
Mar. 30, 2012   (FI) ..................................... 20125372

(51) Int. Cl.
*B01L 3/00*      (2006.01)
*B01L 3/02*      (2006.01)
*G01N 1/14*      (2006.01)
*F16D 63/00*     (2006.01)

(52) U.S. Cl.
CPC ............ *B01L 3/0217* (2013.01); *B01L 3/0227* (2013.01); *F16D 63/006* (2013.01); *B01L 2200/06* (2013.01); *B01L 2400/0475* (2013.01)

(58) Field of Classification Search
CPC ............... G01N 1/10; B01L 3/02; B01L 9/54; B01L 3/0234
USPC ............................ 422/501, 513, 518; 73/1.74
See application file for complete search history.

(56) References Cited

U.S. PATENT DOCUMENTS 5,187,990 A     2/1993  Magnussen, Jr. et al.
5,343,769 A *   9/1994  Suovaniemi et al. ...... 73/864.18
(Continued)

OTHER PUBLICATIONS

Finnish Search Report issued in PCT/FI2013/050359, dated Feb. 11, 2013.
(Continued)

*Primary Examiner* — Jill Warden
*Assistant Examiner* — Brittany Fisher
(74) *Attorney, Agent, or Firm* — Birch, Stewart, Kolasch & Birch, LLP

(57) ABSTRACT

For use in an electronic pipette, a brake mechanism which is used for abruptly stopping the movement of the actuator that moves the plunger, which mechanism comprises a rotatable, essentially circular rotor that is at its periphery provided with brake notches arranged at regular intervals, and a brake actuator comprising a motion inducing means, a brake member (1) to which a brake cam (11*a*), compatible with the brake notches is connected, a mediation mechanism for transmission of the movement of the motion inducing means to the brake member, the brake member comprising, connected to the motion inducing means, a turnable member (2) that is arranged to act with the brake member such that the movement of the turnable member can be accelerated before it essentially effects the movement of the brake member.

6 Claims, 1 Drawing Sheet

(56) References Cited

U.S. PATENT DOCUMENTS

Figure 1:
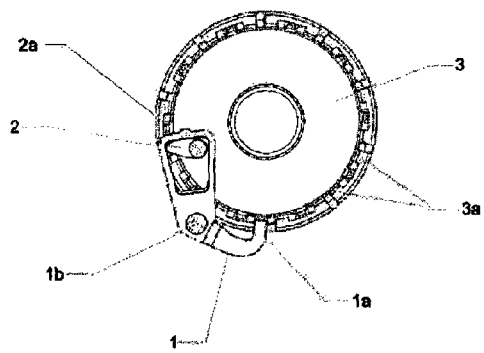

| | | |
|---|---|---|
| 5,879,633 A | 3/1999 | Tervamaki et al. |
| 6,428,750 B1 * | 8/2002 | Rainin et al. ............ 422/516 |
| 6,532,837 B1 | 3/2003 | Magussen, Jr. et al. |
| 6,715,369 B2 | 4/2004 | Baba et al. |
| 7,690,293 B2 | 4/2010 | Bensley et al. |
| 2002/0020233 A1 * | 2/2002 | Baba et al. ............ 73/864.16 |
| 2008/0184823 A1 * | 8/2008 | Kneucker et al. ....... 73/864.16 |
| 2010/0266453 A1 * | 10/2010 | Rylski et al. ............ 422/100 |

OTHER PUBLICATIONS

International Search Report issued in PCT/FI2013/050359, dated Jul. 16, 2013.

Written Opinion of the International Searching Authority issued in PCT/FI2013/050359, dated Jul. 16, 2013.

* cited by examiner

BRAKE MECHANISM FOR AN ELECTRONIC PIPETTE

BACKGROUND

Solutions based on brakeless stepper motors have conventionally been used as an essential part of the operating machinery of electronic pipettes. The combination presented in Finnish patent no. 87740 including an electronic brake, a DC-motor and a closed loop actuator structure with an encoder has proven to be a good one. With such a construction, a better overall outcome for the operation, size and weight of the pipette is accomplished, compared to solutions involving a stepper motor. Good properties achieved with this structure are, among others, the ability to stop the motion rapidly, and an advantageous size-weight/speed-power ratio. The brake device mentioned in FI 87740 is implemented with a spring return solenoid structure. The problem with this brake structure is that the power consumption is high, which is a disadvantageous feature in a battery powered pipette. To keep the brake open, a current must be fed to the solenoid and for speeding up the brake and for speeding up its movement, the power of its spring has to be increased, which increases the operational power consumption.

The brake mechanism according to the present invention solves the above mentioned problems. The brake actuator according to the invention is used for abrupt stopping of the movement of the actuator that moves the plunger. The brake actuator according to the invention comprises an electromotive functional member that turns a brake part stopping the rotational movement by means of a mediating mechanism.

The invention is directed to a brake mechanism for use in an electronic pipette, which mechanism is used for abrupt stopping of the movement of the actuator that moves the plunger. The mechanism comprises a rotatable, essentially circular rotor which is provided at its periphery with brake notches arranged at regular intervals, and a brake actuator comprising an actuating member, a brake member to which a brake cam compatible with the brake notches is connected, a mediation mechanism for transmission of the movement of the motion member to the brake member, the brake member comprising a turnable member connected to the motion member that is arranged to act with the brake member such that the movement of the turnable member can be accelerated before it essentially effects the movement of the brake member.

According to a preferred embodiment the brake member comprises an opening in which the turnable member is adapted, here a lever (2) that is turnably adapted on a shaft (2a). The shape of the opening is arranged to be such that the turnable member can turn between two locked end positions. Preferably, the turnable member turns about 180° from one end position to the other. The size of the opening in relation to the turning lever is such that it enables the turning lever to move between the two positions and that depending of the position of the turning lever in the opening, the turning lever forces the brake member to turn around its axis from a locked position to a free position, and from a free position to a locked position.

According to a preferred embodiment the brake notches of the rotor comprise protrusions for stopping the rotor and slots for locking the rotor in relation to the brake cam. The protrusions in the rotor stop the rotor as the brake cam locks into a slot between two protrusions. Depending on the direction of rotation, the brake cam ends up in the upper or lower brake notch of FIG. 3a. When the rotor rotates counter-clockwise, the brake cam locks into the lower notch and when it rotates clockwise in turn into the upper notch.

In the brake configuration according to the invention, the drive means can be a DC-motor, a linear solenoid or a rotary solenoid.

In the configuration according to the invention the brake drive means is coupled to the brake member by a mediation mechanism. The configuration according to the invention comprising a mediation mechanism has the first advantage of the brake part locking into both end positions. A second advantage of the solution according to the invention is the high momentary velocity of the brake part physically stopping the movement, i.e. the turnable member. The mediation member between the brake drive means, i.e. the movement-inducing means (the motor), and the brake member enables the brake motor to accelerate before the movement for stopping the brake member rotor begins. Thus, the turning movement of the turnable member reaches its top speed almost immediately as the movement begins, whereby the brake member hits its target location in the rotating rotor in a more controlled manner. On the other hand, the high velocity of the brake member enables, in terms of functionality, a preferred higher velocity of the stopping part at the braking moment. A third advantage is that due to the kinetic energy accumulated during the acceleration of the drive means, force is gained in the movement of the brake member in the very beginning of the movement, which leads to more reliable opening and closing of the brake.

The mediation mechanism functionality according to the invention can be implemented with a crank mechanism or a cam gear mechanism. In both mechanisms the brake actuator turns approximately 180 degrees in all, and the brake member stopping the movement turns a fraction of this. In a cam gear mechanism, the brake member and the brake actuator are coupled to each other with a connecting rod. In this mechanism the brake part reaches its top angular velocity between the two ends of the movement of the brake actuator, the velocity is zero or close to zero at the end positions. According to a preferred embodiment, the actual brake member stopping the rotation movement is moved by a cam gear mechanism that is simpler than a crank mechanism.

An advantage of the invention over the prior art is also that in the structure according to the invention, the brake locks the rotor into place without any clearance causing a movement error.

A significant advantage of the structure according to the invention is the ability of the brake to lock into the extreme positions, preventing undesired closing of the brake during running in case of a loss of electricity. This is a very important feature since braking while running at high speed may break the operating mechanism.

According to the invention the brake motor turns the brake member back and forth by means of the mediation mechanism. In a preferred embodiment the brake member turns about 20°. At one end the "barb" of the brake member locks the rotating movement of the rotor and at the other end the rotation is free.

In FIGS. 1-4, one technical solution for implementing the function according to the invention is presented. FIG. 1 shows the brake member (1) that is attached to the body of the brake at its pivot pin (1b) such that it can turn. The task of the brake cam (1a) of the brake member is to stop the rotation of rotor (3) by setting into a brake notch (3a) of the rotor. The turning lever (2) is locked onto the shaft (2a) of the electric motor (not shown) and is so located that at the extreme ends of its movement the brake member is either open or closed. In the situation in FIG. 1, the brake is closed and the relative location and the geometry of the brake member and the turning lever locks the brake at the position even though the motor is not powered on.

Figure 2:
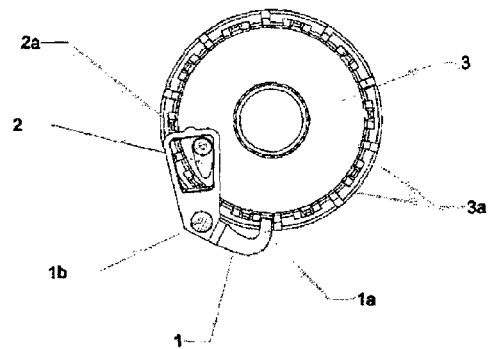

In FIG. 2, the motor is switched on and the turning lever has accelerated freely approximately 90° and is about to hit the brake member.

Figure 3:
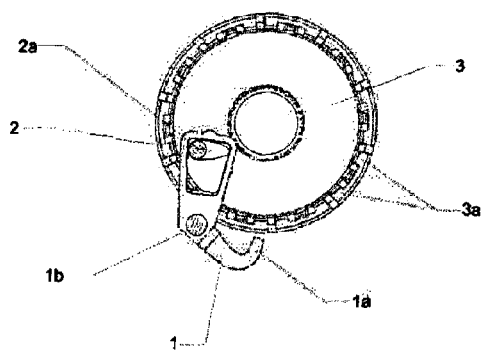

In the situation of FIG. 3, the turning lever has turned to its other end position and has at the same time turned the brake member into its open position. Also in this position, the brake is locked into position as in FIG. 1.

Figure 4:
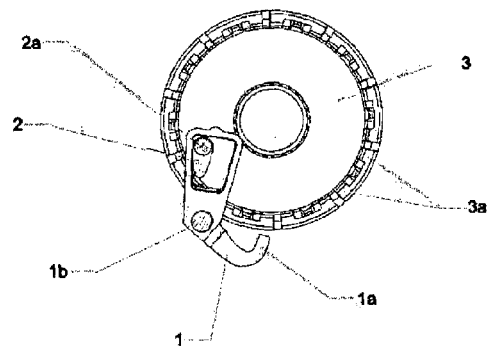

In FIG. 4 we are in the situation of FIG. 2 of applying the brake.

Figure 5:
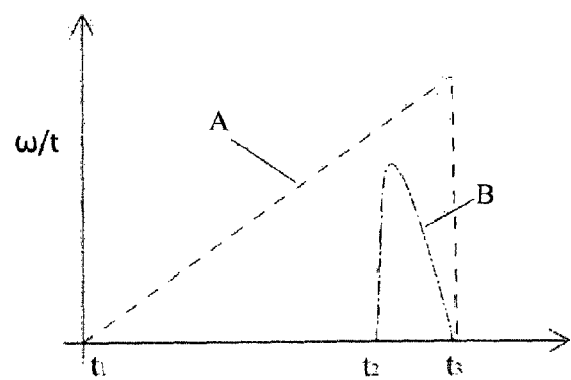

In FIG. 5, the power generation and speed advantage achieved by the mechanism are illustrated. The X-axis represents time and the Y-axis the angular velocity. When the motor is turned on at time t1, it accelerates according to graph A. Graph B illustrates the angular velocity of the brake part. At time t2 the turning lever hits the brake member at high speed, quickly turning it to its other end position. At time t3 the movement of the parts stops and the brake is locked at the other end position.

The invention claimed is:

1. An electronic pipette, comprising:
 a plunger;
 an actuator for moving the plunger;
 a brake mechanism to be used for abrupt stopping of a movement of an actuator that moves a plunger, which mechanism comprises:
  a rotatable, essentially circular rotor, having at its periphery brake notches arranged at regular intervals; and
  a brake actuator, wherein the brake actuator comprises:
   a movement-inducing means;
   a brake member having an opening and a brake cam compatible with the brake notches of the circular rotor;
   a lever; and
   a movement mediation member, wherein the lever is connected to the movement-inducing means via the movement mediation member so that the lever is turned by the movement-inducing means, and the lever is rotatably disposed within the opening of the brake member so that the brake member is turned by rotation of the lever between its end positions within the opening of the brake member and the brake cam of the brake means is engaged with the brake notches of the circular rotor to stop of rotation of the circular rotor; and
 a hollow cylinder that contains the plunger, actuator, and the brake mechanism of the electronic pipette and is adapted to hold fluid being aspirated and dispensed by the electronic pipette.

2. The electronic pipette according to claim 1, wherein the lever is lockable into two end positions within the opening of the brake member.

3. The electronic pipette according to claim 1, wherein the movement-inducing means is an electric motor.

4. The electronic pipette according to claim 1, wherein the lever is disposed within the opening of the brake member such that the lever can turn between two end positions.

5. The electronic pipette according to claim 4, wherein the brake member is arranged to turn around a pivot.

6. The electronic pipette according to claim 1, wherein the movement mediation member is a shaft.

* * * * *